Fig. 5 — 19 PITCH GRINDING WHEEL

Fig. 6 — DRESSING TOOL PROFILE

Fig. 7

INVENTORS:
JOHN J. DI PONIO
WILLIAM J. FUHRMAN
ATTORNEYS.

| HELICAL GEAR DATA — ROLLING FORM DIE | |
|---|---|
| NUMBER OF TEETH | 150 |
| DIAMETRAL PITCH-NORMAL | 18.88370294 |
| PRESSURE ANGLE-NORMAL | 23.32399147 |
| HELIX ANGLE REF. | 21.62461626° |
| HAND OF HELIX | LEFT |
| LEAD | 67.71551900 |
| PITCH DIAMETER REF. | 8.54475200 |
| BASE DIAMETER REF. | 7.75158000 |
| FORM DIAMETER REF. | 8.4305 |
| MINOR DIAMETER | 8.3867-8.3857 |
| CIRCULAR TOOTH THICKNESS-NORMAL REF. | .06569 |
| MEASUREMENT OVER (2) .125 BALLS | 8.7507-8.7497 |
| MAJOR DIAMETER | 8.6412-8.6402 |
| MAX. PITCH TOLERANCE | .0002 |
| MAX. INDEX TOLERANCE | .0005 |
| MAX. PITCH DIA. RUNOUT | .0004 |

Fig. 15

INVENTORS:
JOHN J. DiPONIO
WILLIAM J. FUHRMAN
BY
ATTORNEYS.

Jan. 9, 1968  J. J. DI PONIO ET AL  3,362,059
GEAR ROLLING DIES AND METHOD FOR MANUFACTURING
EXTERNAL TOOTH GEARS
Filed Dec. 28, 1965  12 Sheets-Sheet 7

Fig. 12

LEAD TOLERANCE
DRIVE AND COAST SIDES

INVENTORS:
JOHN J. DiPONIO
BY WILLIAM J. FUHRMAN
ATTORNEYS.

Fig. 17A
Fig. 17B
Fig. 18

CREST OF CROWN TO BE WITHIN CENTRAL 55% OF FACE WIDTH

AVERAGE OF FOUR 90° SPACED TEETH VARIATION BETWEEN ANY TWO TEETH NOT TO EXCEED .0003

+.0005 / -.0001 CROWN BOTH SIDES

| EXTERNAL GEAR DATA - FULL FILLET ROOT | |
|---|---|
| MAJOR DIAMETER | 1.219 - 1.209 |
| NO. OF TEETH | 19 |
| WIDTH OF TOOTH | .711 - .706 |
| LEAD TOLERANCE | ± .00035 |
| INVOLUTE TOLERANCE - STARTING AT 14° ROLL | +.0000 -.0009 |
| NORMAL DIAMETRAL PITCH | 19.3 |
| HELIX ANGLE REF. | 21.06166329° R.H. |
| LEAD | 8.6060 |
| NORMAL PRESSURE ANGLE | 20° |
| PITCH DIAMETER | 1.05493150 |
| BASE CIRCLE DIAMETER | .98282300 |
| MINOR DIAMETER | .967 - .947 DIA. |
| NORMAL CIRCULAR TOOTH THICKNESS AT P.D. | .1004 - .0989 |
| TO MEASURE 1.2765 - 1.2737 OVER TWO .109375 BALLS (REF.) | |

United States Patent Office 3,362,059
Patented Jan. 9, 1968

3,362,059
GEAR ROLLING DIES AND METHOD FOR MANUFACTURING EXTERNAL TOOTH GEARS
John J. Di Ponio, Farmington, and William J. Fuhrman, Detroit, Mich., assignors to Ford Motor Company, Dearborn, Mich., a corporation of Delaware
Filed Dec. 28, 1965, Ser. No. 516,929
17 Claims. (Cl. 29—159.2)

Our invention relates generally to the manufacture of gears. It relates more particularly to the generation of external tooth gears.

Gear manufacturing techniques used in the production of precision bears involve either gear forming methods or gear generating methods. Mass production of gears, however, involves only gear generating techniques. In gear forming methods, a cutting tool, such as a milling cutter, is provided with cutting teeth that conform to the shape of the desired tooth space. The milling cutter teeth are made by a forming method. The cutter is selected from a series of standard cutters for each pitch. The selection of the cutter for any given pitch depends upon the number of teeth in the gear to be cut.

In gear generating methods, the tooth generating tool is formed with a shape that is conjugate to the form of the tooth when the tooth is rolled into contact with it.

A basic gear rack form is used in most gear generating methods. If the tool used is a cutting tool, the cutting action can be accomplished either by reciprocating the rack in the direction of the axis of the gear blank or by rolling the gear blank with respect to the rack. The proper gear tooth profile, which usually is an involute profile form, is produced as successive cuts are taken by the teeth on the rack. In other gear generating methods, however, such as gear shaping and gear shaving, a circular cutter form with involute cutting teeth may be used to produce the successive cuts during the generating process.

In actual gear manufacturing practice, as in the improved gear rolling technique herein disclosed, a rack-shaped tool is not used although tools having the same tooth geometry as a basic rack-shaped cutter are in general use. An example of this is a gear hobbing tool. In a preferred form of our improved gear generating method, we may employ both a hobbing cutter and a pair of circular gear rolling dies. Like the hobbing cutter, the dies are formed with gear generating teeth having a gear rack geometry. The die teeth, however, are modified so that their geometry deviates from that of a corresponding basic rack tooth.

Unlike known forms of gear rolling, the rack teeth of our improved dies are rotated into meshing engagement with a gear blank that has been prehobbed. The teeth of rolling dies produce a metal flow during rolling as metal is displaced on the gear blank. A cutting action such as that experienced in gear shaping and gear shaving does not occur. The motion of the dies is entirely angular or rotary as distinct from the reciprocating motion that is characteristic of the rack teeth in prior art systems. As mentioned previously, the reciprocating motion found in prior art systems occurs either in a direction parallel to the axis of the gear blank or in a direction transverse to it.

In our improved gear generating method, we mount a set of dies, which may be interchangeable, for rotation about parallel axes. Provision is made for mounting a gear blank between the dies on a line drawn between the centers of the dies. In this respect, this part of our improved method bears some similarity to methods that are used currently for rolling screw threads and small pitch diameter helical gears. The dies used in a conventional thread rolling apparatus, however, are themselves of helical thread form and bear no similarity to the basic rack teeth of the dies that are used in our gear rolling method.

Provision is made for closing the center distance between dies by using a fluid pressure operated piston and cylinder mechanism. Both dies may be driven by a mechanical torque delivery path. The infeed or displacement of the dies is limited by a mechanical stop, the position of which can be controlled for any given part gear. As the teeth of the dies engage the gear blank, an involute profile is generated on the gear blank. As the gear tooth profiles are formed, the teeth of the dies displace the metal of the gear blank. The direction of the metal flow on one side of the generated gear tooth, which may be the driven side, of the involute profile, differs from the direction of flow of the metal on the other tooth side which may be the coast side. In the latter case, the metal flows both in a radially outward direction and in a radially inward direction from a location falling on the pitch circle. The metal flow on the driven side, in contrast, originates at the radially outward region and at the radially inward region of the gear profile and then progresses in the direction of the pitch circle location.

Because this deformation takes place, the gear tooth itself is subjected to high compressive stresses, thereby tending to elongate the tooth. Our improved gear generating method takes into account these differences in the character of the metal flow on either side of the generated gear tooth, and it takes into account also the tooth deformation due to the stresses that are incurred during the rolling operation. The resultant gear tooth profile then will satisfactorily meet precise geometric specifications with close tolerances and a minimum pitch diameter runout.

The development of a gear rolling method of the type above set forth being a principal object of our invention, it is another object of our invention to provide improved gear rolling dies for use in a gear rolling method of the type set forth above.

It is also an object of our invention to eliminate excessive wear of the dies during the rolling operation. We have accomplished this in a preferred form of our invention by preceding the rolling operation with a gear hobbing step. That is, the gear blank is prehobbed with a conventional gear hobbing cutter having teeth that are in the form of a basic gear rack. The gear blank is cut in this fashion to remove excess metal prior to the rolling operation, thereby reducing the volume of metal that must be displaced by the gear teeth of the dies during a subsequent rolling operation. The finished dimensions of the generated gear are determined by the gear rolling dies rather than by the gear hobbing operation.

Further objects and features of our invention will become apparent from the following description and from the accompanying drawings, wherein.

Figure 3:
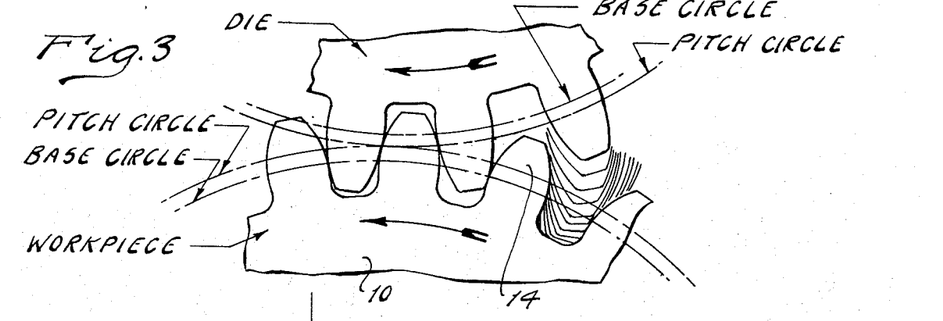
FIGURE 3 shows in schematic form the teeth of a rolling die and a meshing gear blank, the teeth of the latter being generated by rolling the teeth of the die into engagement with the gear blank. In contrast, if the work piece is rolled with a tool in the form of a rack, rather than the circular die illustrated schematically in FIGURE 3, the sides of the rack teeth would be straight. Rack teeth with straight sides are shown in FIGURE 6 which illustrates the dressing tool profile.

In FIGURE 3 of the drawings, we have shown a part gear 10 in rolling engagement with a rolling die. Each rolling die of FIGURE 3 has a rotary motion, and in this respect it is unlike a conventional, reciprocating rack used in gear rolling operations. The teeth of such conventional racks have straight sides rather than the involute form shown in FIGURE 3. As the teeth of the cutter move into engagement with the teeth 14 of the gear blank, the gear teeth are generated in successive steps. The relative positions of the teeth of the rack 12 with respect to the teeth 14 is indicated by the successive overlying views of the tips of the teeth for rack 12.

In actual practice, successive passes of each tooth 14 through the meshing teeth of the dies would normally occur. Thus, as the dies are rotated all the metal of the gear blank would not be deformed during a single revolution. Instead the dies would be advanced continuously toward the gear blank, thereby closing the center distance between the dies as rolling action continues.

Figure 1:
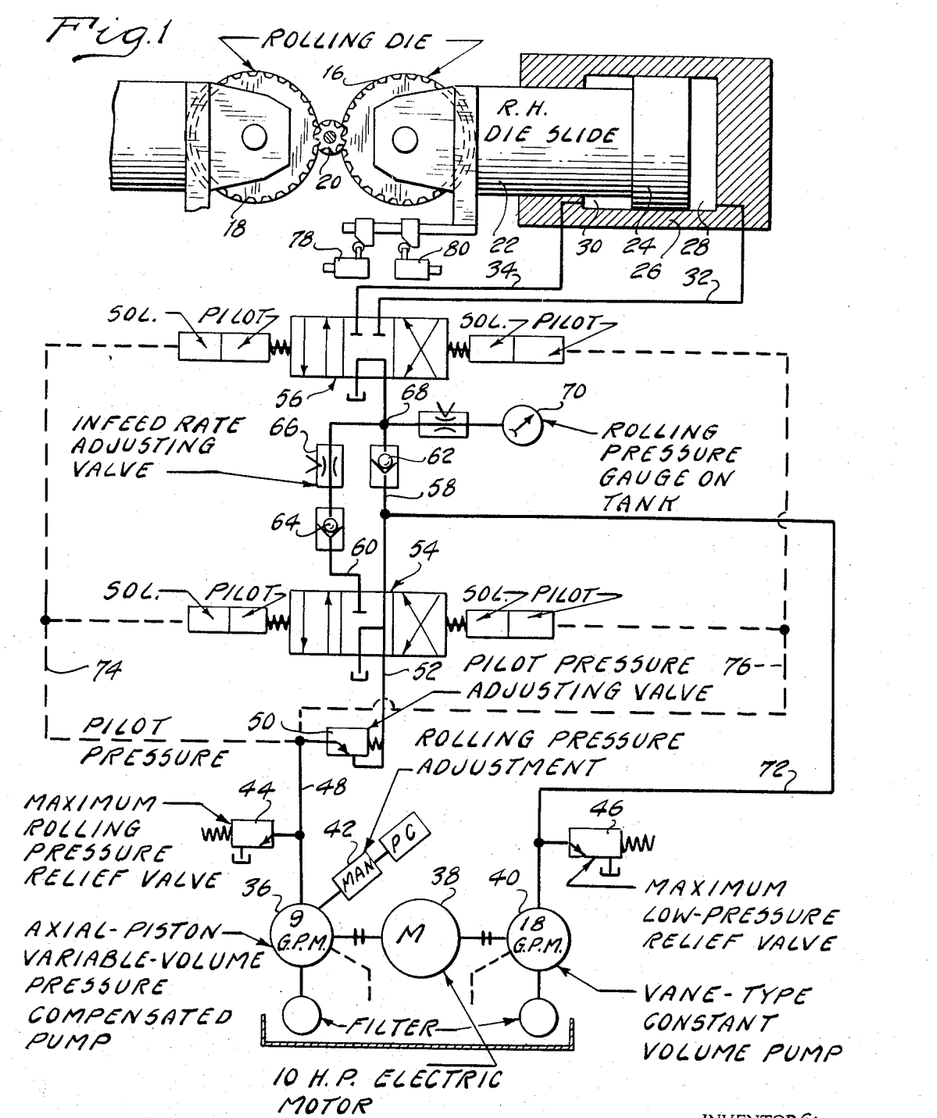
FIGURE 1 shows in schematic form a piston and cylinder assembly and a control valve arrangement for actuating gear forming dies.
Figure 2:
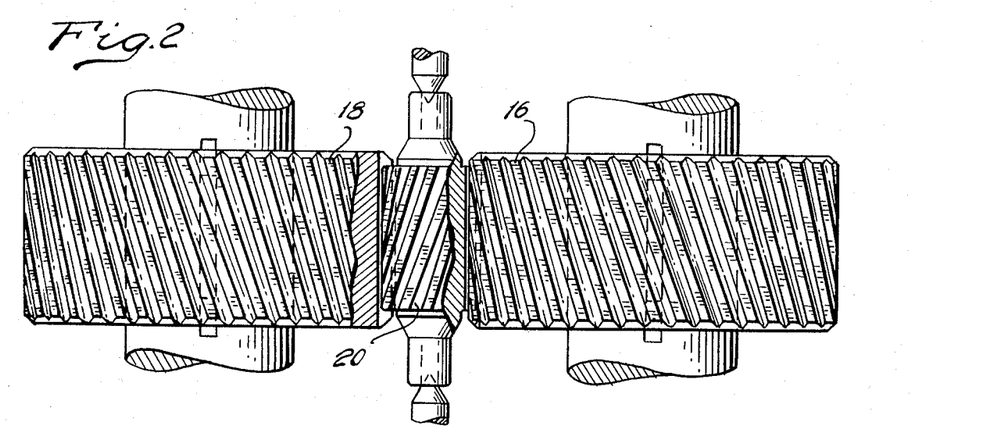
FIGURE 2 shows a pair of rolling dies and a gear blank situated in registry with the dies.

As seen in FIGURE 2, the dies, in actual practice, are mounted for rotation about parallel axes. The pinion 20 is situated between the dies in meshing engagement with them. As the center distance between the dies 16 and 18 is decreased, the depth of the rolled involute teeth for the pinion 20 increases. This displacement of the dies is accomplished by using a gear rolling machine having a hydrostatic cylinder and piston mechanism as illustrated schematically in FIGURE 1.

In FIGURE 1, the right-hand die 16 is journaled rotatably on a die slide shown at 22. The die slide 22 is connected directly to a piston 24, which is slidably received within a cylinder 26. The piston 24 and the cylinder 26 cooperate to define a pair of opposed pressure chambers 28 and 30. Pressure is distributed to pressure chamber 28 through a pressure passage 32, and pressure is distributed to the other side of the piston 24 through a passage 34.

The die slide can be adapted for rapid traverse to the gear rolling position and for accommodating a pressure buildup following a rapid traverse to the rolling position, thereby causing the rolling dies to displace the metal of the gear blank. Pressure is supplied to the chamber 28 by a piston pump of variable volume as indicated at 36. This pump is powered by an electric motor 38. The same motor powers a second pump of constant volume as shown at 40. The pump 40 is used to provide a rapid traverse and a rapid retract of the die slide. At this time the output from the pump 36 is added to the output of the pump 40.

Since the pump 36 is relied upon to produce rolling pressure, a suitable manual adjustment for the pump 36 is provided as shown at 42. Each pump 36 and 40 is provided with its own independent pressure relief valve, as indicated at 44 and 46, each relief valve being situated on the output side of its respective pump.

Valve 44 is situated in a passage 48, which communicates with a pilot pressure adjusting valve 50. This valve controls communication between passage 48 and a passage 52, which communicates with a directional valve 54.

A second directional valve is shown at 56. It is connected hydraulically to the valve 54 through a passage 58. A second passage 60 communicates with valve 54 in parallel disposition with respect to the passage 58. Each passage 58 and 60 is provided with a one-way flow valve as indicated at 62 and 64, respectively.

A controlled orifice valve 66 controls the rate of movement or infeed for the die slide 22. A common point 68 for the passages 58 and 60 is connected to a rolling pressure gauge 70, which provides a visual indication of rolling pressure. The output pressure passage 72 for the constant volume pump 40 communicates with the passage 58 at a location intermediate the valve 62 and the valve 54.

Valve 50 provides a controlled pilot pressure in passages 74 and 76 which extend, respectively, to the lefthand sides and the right-hand sides of the valves 54 and 56. A suitable pilot operator is situated on each side of each of the valves 54 and 56.

The one-way flow check valves 62 and 64 prevent interchange of fluid between the pumps 36 and 40 during a rolling operation.

When the die slide is inactive, the output from pump 36 and the output from the pump 40 is combined at a point intermediate valves 62 and 54. It is then distributed through valve 62 and through the four-way directional control valve 56 to the sump. The pilot pressure valve 50 maintains a pressure on the discharge side of the pump 36. But since the discharge side of the pump 40 is open when the die slide is inactive, the output pressure on the pump 40 is substantially zero. During the rapid traverse phase of the operating cycle, both four-way valves are shifted in a right-hand direction, thereby establishing direct communication between passages 52 and 58 and between passages 58 and 32. The output flow of each pump then is combined and distributed to the pressure chamber 28.

When the rolling action begins, valve 54 is shifted in a left-hand direction, thereby connecting passage 72 to the sump and connecting simultaneously the passage 52 to the passage 60. Thus the discharge flow of the pump 40 is directed to the sump and the discharge flow of the pump 36 is distributed through the valve 64 and through the infeed rate adjusting valve 66 to the point 68. It then is transferred through the valve 56 to the working chamber 28.

As the die tooth penetration into the gear blank progresses, the pump 36 will automatically reduce its volumetric output in proportion to the increase in the required rolling force. The die penetration can be sensed by suitable cam operated, position sensing valves 78.

To establish rapid retraction of the die slide, the positions of the four-way valves 54 and 56 are interchanged. That is, valve 54 is shifted in a right-hand direction and the valve 56 is shifted in a left-hand direction. This establishes communication between point 68 and the output side of each of the pumps 36 and 40 and also between point 68 and the pressure chamber 30. Thus the discharge flow of each pump is combined and distributed to the pressure chamber 30.

When the die slide reaches its retracted position, the four-position valves again assume their center positions as indicated in FIGURE 1. The valve 56 establishes free communication between chamber 28 and the sump during the retraction of the die slide. During the slow infeed, the valve 56 also functions to connect the working chamber 30 to the sump as it assumes a right-hand position.

Figure 7:
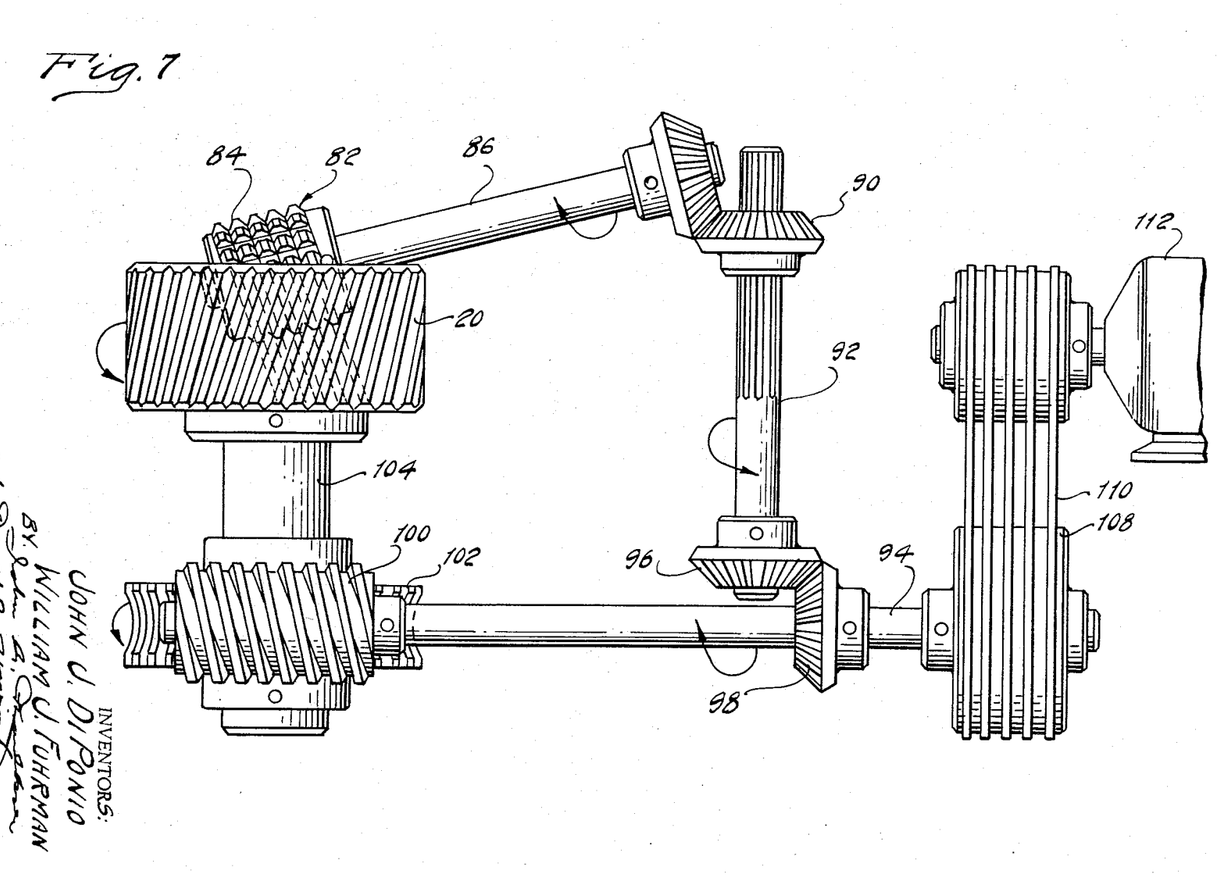
FIGURE 7 shows in schematic form a hobbing cutter for preforming of a gear blank before the latter is subjected to rolling action.
Figure 8:
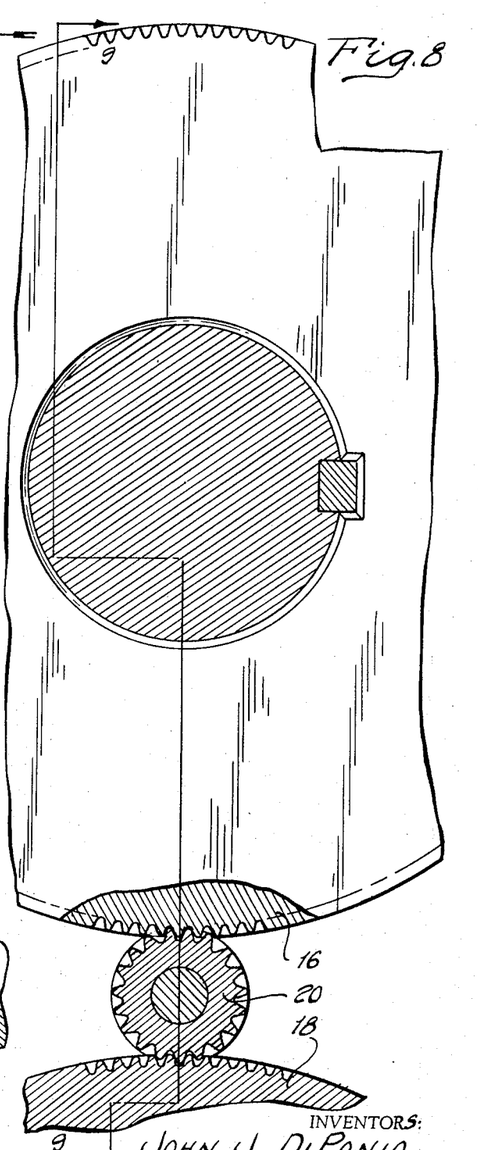
FIGURE 8 is a side elevation view of one of the rolling dies of FIGURE 2 as seen from the plane of section line 8—8 of FIGURE 9.
Figure 9:
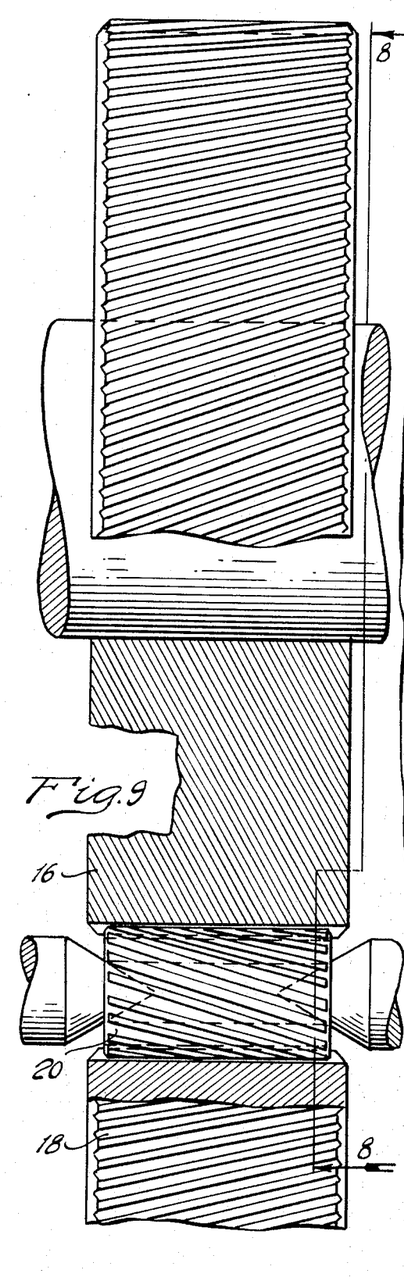
FIGURE 9 is a cross-sectional view of the rolling die of FIGURE 8 as viewed from the plane of section line 9—9 of FIGURE 8.

As indicated previously, the gear blank is prehobbed by a hobbing cutter of the type schematically illustrated in FIGURE 7. This includes a cutting tool 82 having basic rack teeth 84 positioned in the form of a spiral on a hobbing cutter shaft 86. This shaft is geared drivably to a bevel gear 90 which in turn is conected to a driving shaft 92. Shaft 92 is connected to a pulley driven shaft 94 through right angle gearing 96 and 98. Shaft 94 in turn carries an index worm 100, which meshes with a gear 102. This gear 102 in turn drives shaft 104 to which gear blank 20 is drivably connected.

Shaft 94 carries a pulley 108, which is powered by belts 110. Belts 110 are powered by a suitable driving motor 112.

The hobbing cutter rotates at a relatively high speed and removes metal from the periphery of the blank as the latter is rotated.

Figure 20:
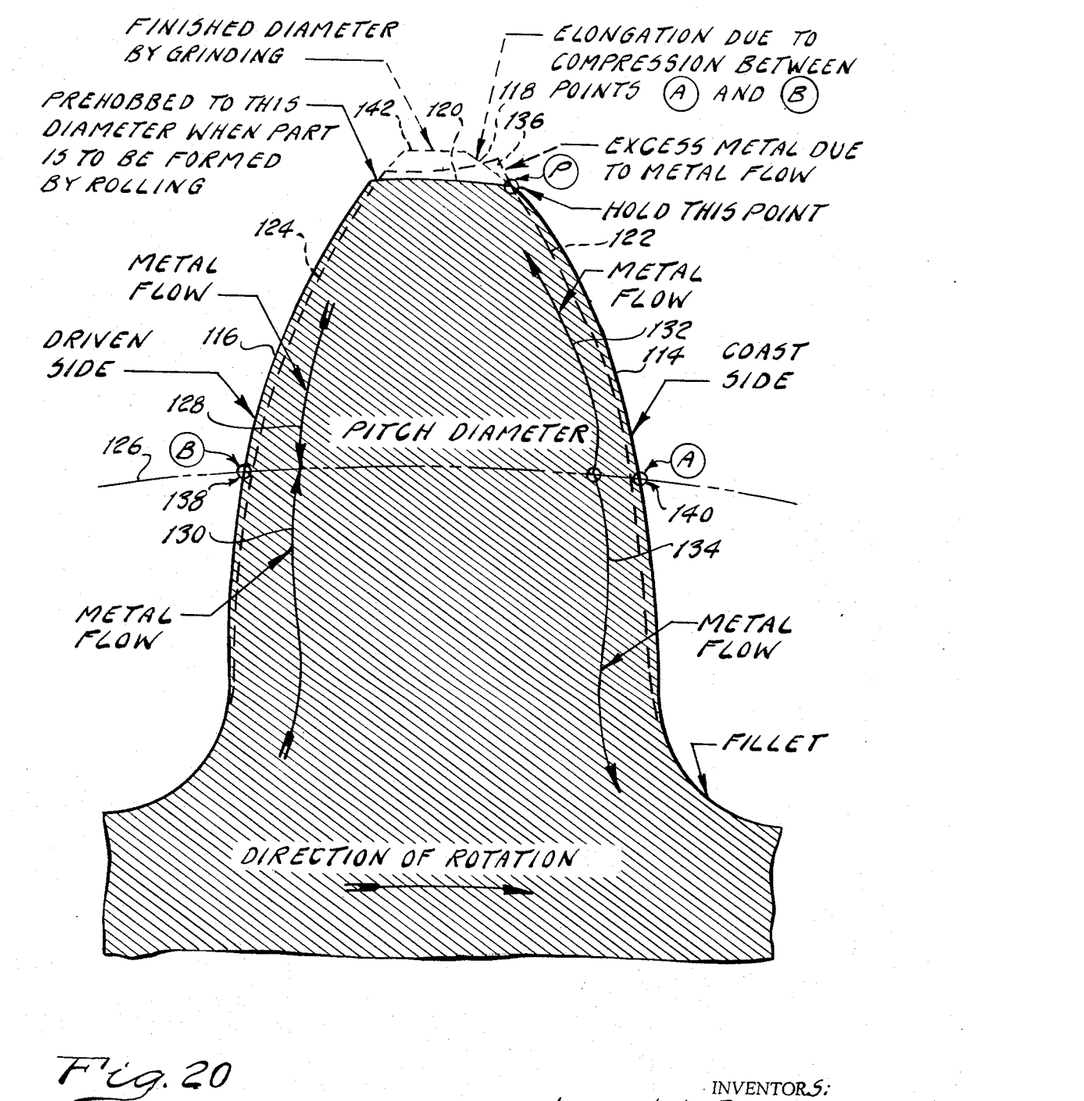
FIGURE 20 shows in schematic form the metal flow for a rolled pinion tooth.

After the hobbing operation is completed, the gear tooth form is substantially as shown in FIGURE 20 by means of full lines. The coast side of the gear tooth of FIGURE 20 is shown at 114 and the driven side is shown at 116. Each side, after the hobbing operation, may be a true involute profile. But the hobbing is not continued to the full depth as is the usual practice when the hobbing operation is to be followed by a shaving operation. In contrast, relatively large tolerances are intentionally maintained on the prehobbed part. If desired, the gear tooth tip can be chamfered as shown at 118.

The outer addendum circle of the gear tooth which is maintained during the prehobbing operation is shown at 120. The diameter of this circle will be increased during the rolling operation, however, due to the compressive stresses of the die teeth on the teeth of the part between points 138 and 140 of FIGURE 20. During the rolling operation, metal is displaced from the profile surfaces of the prehobbed gear tooth so that the profile that is formed differs somewhat from the profile shown at 114 and 116, but they are similar involutes. The modified finished profile is identified by number 122 on the coast side of the tooth and by the number 124 on the driven side of the tooth. The pitch circle for the gear tooth is shown at 126.

During the rolling operation, metal is displaced as indicated by the direction arrows 128 and 130 on the driven side of the tooth. The metal flows from the region of the root of the tooth and from the region of the tip of the tooth toward the pitch circle. On the coast side of the tooth the metal is displaced as indicated by the directional arrows 132 and 134. During the rolling process the metal that is displaced toward the tooth tip will cause a slight excess of metal buildup as indicated at 136. This can be machined off as the final step of the gear generating process if desired. The metal buildup occurs at a point radially outward from the working surfaces of the tooth profile, and in most instances can be disregarded. The compression of the tooth during the rolling operation between points 138 and 140 will produce a slight plastic elongation of the tooth in a radial direction. This causes a prehobbed addendum circle diameter to increase from the diameter illustrated at 120 to a new finished diameter shown at 136. The precision profile is continued to point P, which is held during the generating process.

Figure 5:
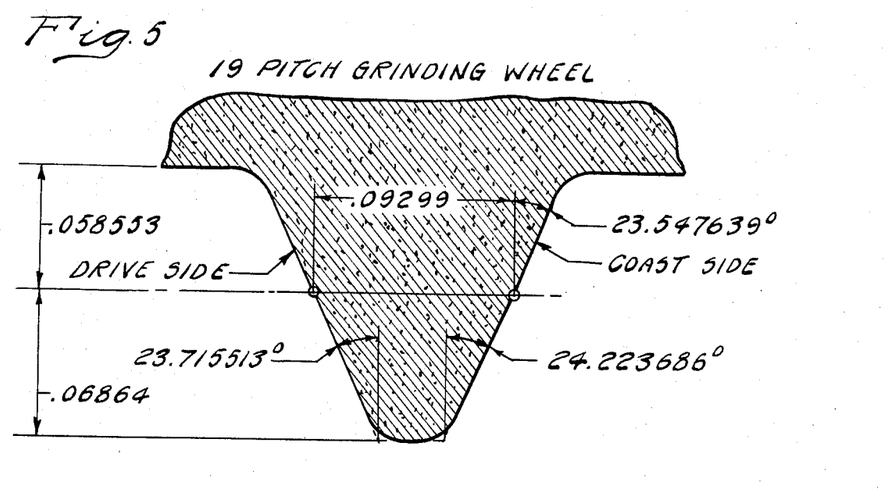
FIGURE 5 shows the geometry for a grinding wheel which is used to grind the rack teeth of the dies of FIGURE 2.

The basic rack form for the grinding wheel that is used to generate the teeth of the dies is indicated in FIGURE 5. The profile of the wheel of FIGURE 5, unlike the profile commonly found in basic rack teeth, has a double pressure angle on the coast side. In the embodiment shown, the drive side of the tooth is formed with a single pressure angle, although we contemplate that a compound pressure angle can be used also on the drive side when rolling gears or pinions having characteristics that differ from that which is illustrated in FIGURES 17A, 17B, 18 and 19.

Figure 6:
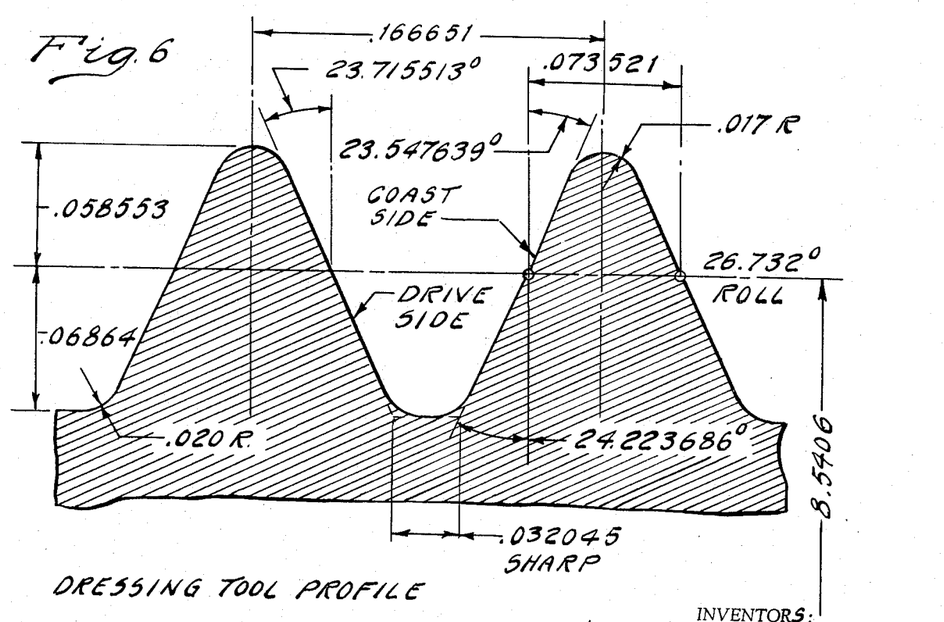
FIGURE 6 shows the gear tooth profiles for a dressing tool for the grinding wheel of FIGURE 5.

The grinding wheel of FIGURE 5 can be dressed by means of a dressing tool shown in FIGURE 6. The teeth of this tool are arranged so that the space conforms generally to the shape of the periphery of the grinding wheel of FIGURE 5. That is, one side of each tooth is formed with a double pressure angle. The values of these angles are indicated in FIGURES 5 and 6.

Figure 4:
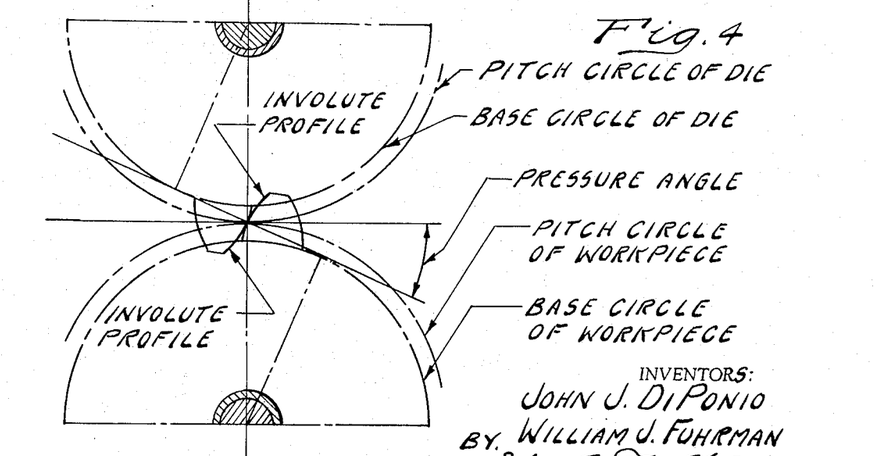
FIGURE 4 shows in diagrammatic form the involute geometry for a pair of meshing involute gears.

For purposes of orientation, reference is being made to FIGURE 4 for an illustration of the geometric significance of the pressure angle to which the sides of the teeth of the basic racks of FIGURES 5 and 6 are formed. The pressure angle as indicated in FIGURE 4, is the angle between the line of action and the common tangent to the base circles for the gears involved, which in this case are the rolling dies and the workpiece.

Figure 16:
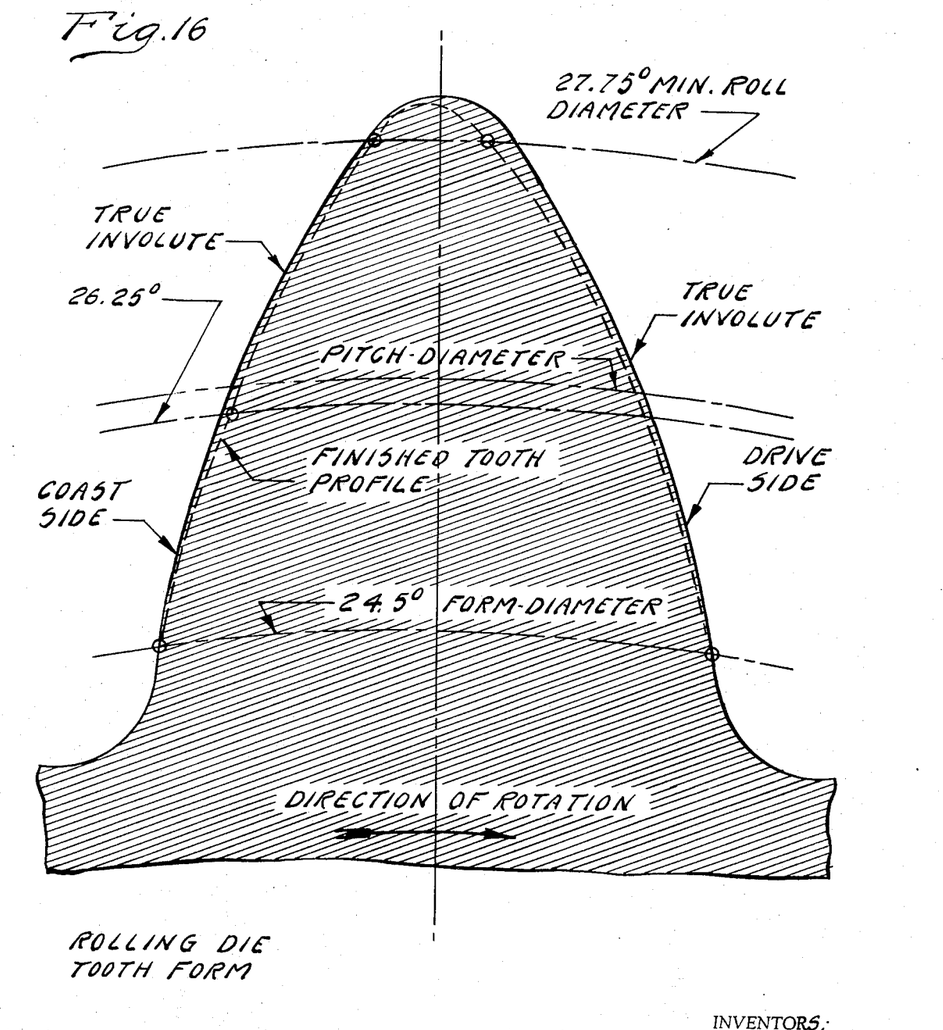
FIGURE 16 shows an enlargement of the die tooth form.
Figure 17A:
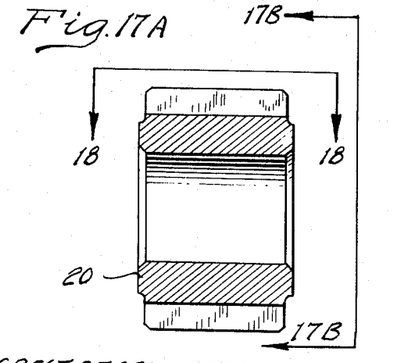
FIGURE 17A shows in cross-sectional form a pinion that can be rolled by using the dies of FIGURE 2 with a die tooth profile as shown in FIGURE 16.
Figure 17B:
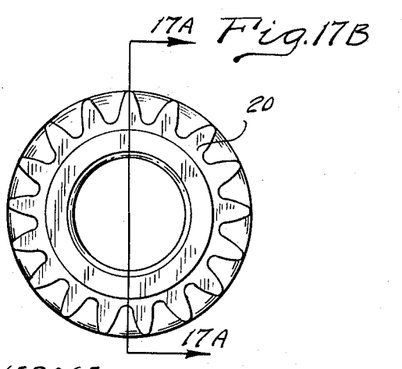
FIGURE 17B is a view of the pinion of FIGURE 17A as seen from the plane of section line 17B—17B of FIGURE 17A.
Figure 18:
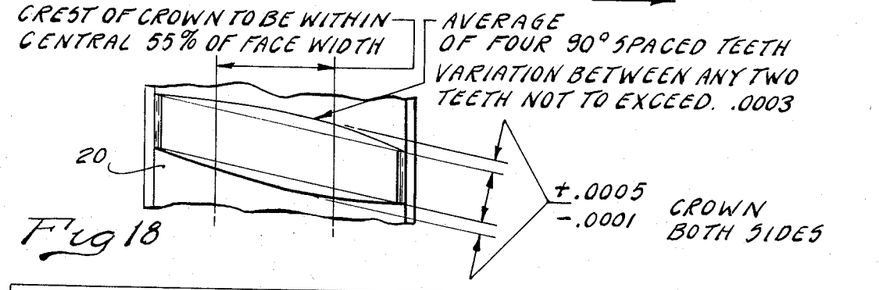
FIGURE 18 shows a plan view of one of the pinion teeth of FIGURE 17A.
Figure 19:
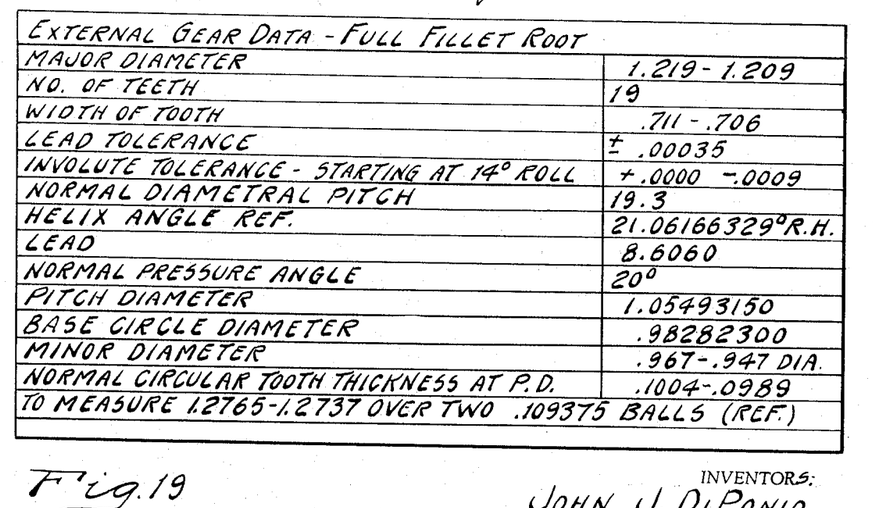
FIGURE 19 shows a tabulation of the external gear tooth data for one pinion that may be rolled with dies of the type shown in FIGURE 2 and with a die tooth form as shown in FIGURE 16.

By employing rolling dies having the tooth configuration shown in FIGURE 16, the pinion of FIGURES 17A, 17B, 18 and 19 can be formed with the specified tolerances. The grinding operation, which involves the use of the grinding wheel of FIGURE 5 and the dressing tool of FIGURE 6, results in the die tooth form of FIGURE 16. In FIGURE 16 the solid line gear tooth profile indicates a true involute form. This is illustrated in order to compare it to the shape of the profile that is obtained by employing the grinding wheel of FIGURE 5. The actual finished shape of the die tooth form deviates from the true involute form as represented in FIGURE 16 by dotted lines. On the drive side there is a continuous curve extending from a point corresponding to a roll angle diameter of 24.5° to a point corresponding to the minimum roll diameter of 27.75° near the tip of the tooth. On the coast side, however, there is a discontinuity in the die tooth form at a location corresponding to a roll angle of 26.25°. Between that point and a point corresponding to a roll angle diameter of 24.5° there is a continuous curve. This curve has a different form, however, than the curve that extends radially outwardly from that point to the point corresponding to the roll angle diameter of 27.75°.

The roll angles are measured on a standard gear checker. The die, during a checking operation, is mounted upon the checker and rolled through a given angular displacement in the usual fashion. The indicator that follows the profile of the tooth is set at a zero reading at a point corresponding to a roll angle of 24.5°. The die then is rolled with the indicator following the contour of the die tooth form until the roll angle is at least 27.75°. Readings are obtained between the two extreme positions. The diameter corresponding to these roll angles are herein referred to as roll angle diameters.

Figure 13:
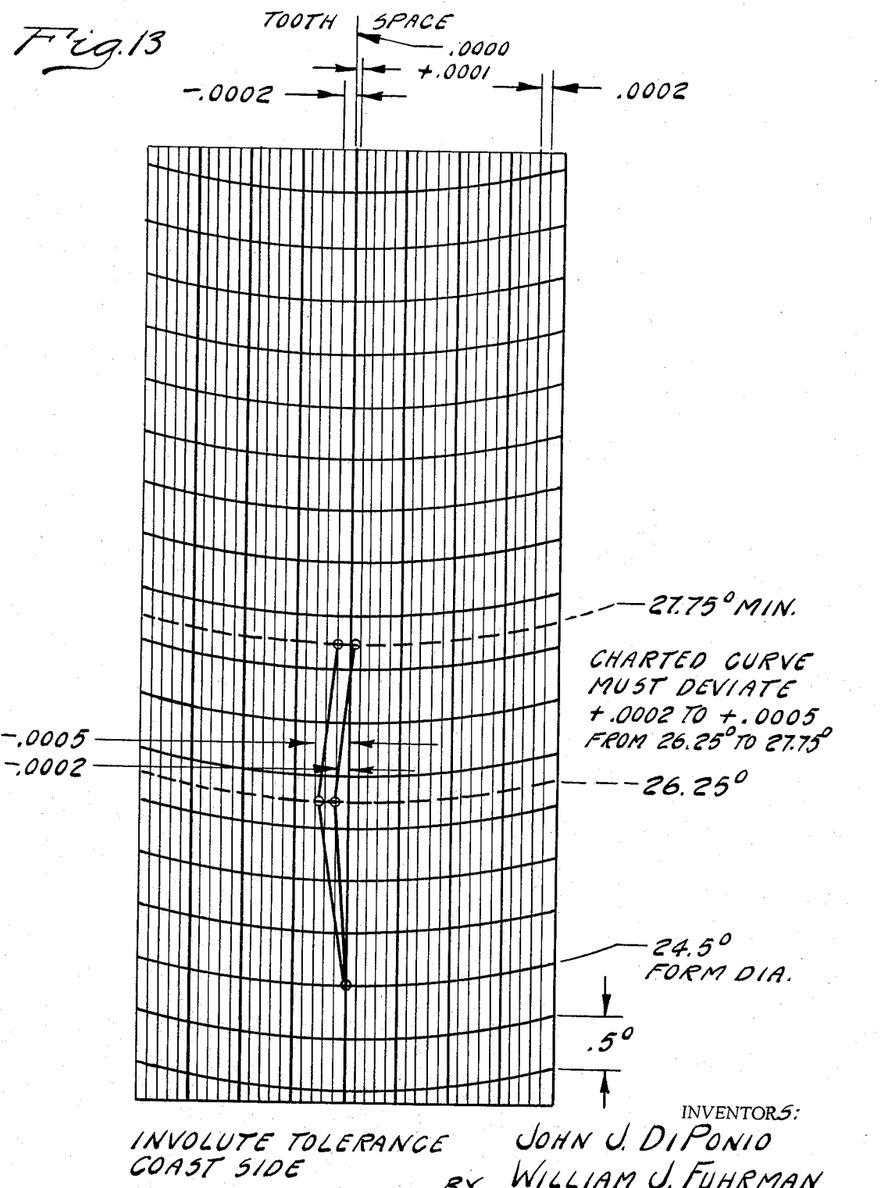
FIGURE 13 shows a gear checker trace recording which indicates the range of involute tolerances on the coast side of the rolling dies of FIGURE 2.
Figure 14:
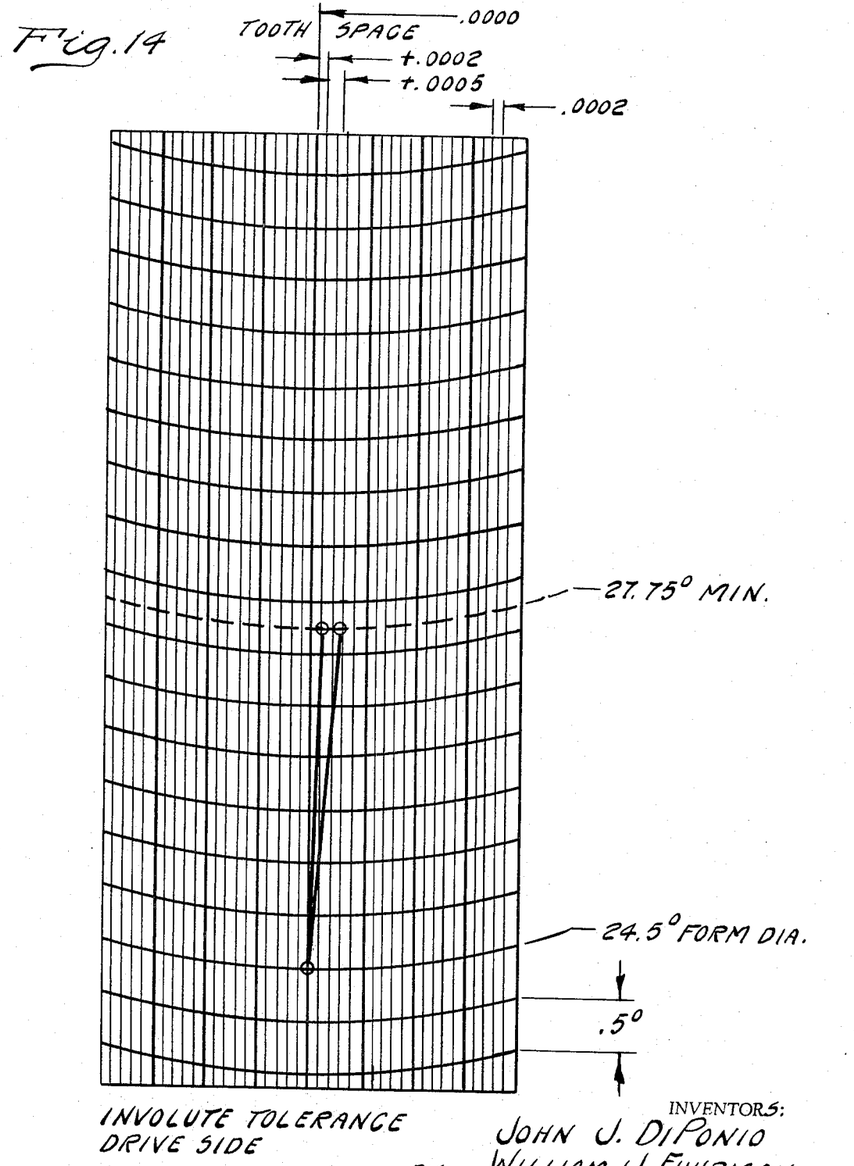
FIGURE 14 is a gear checker trace recording showing the desired involute tolerances on the drive side of the rolling die teeth.
Figure 15:
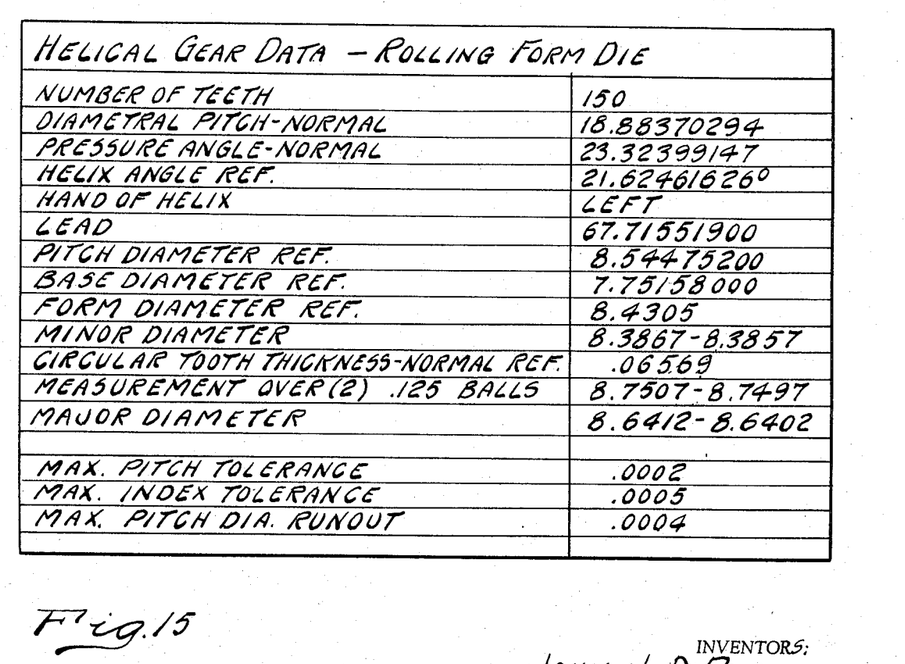
FIGURE 15 shows a tabulation of the helical gear data for the rolling dies used in forming the pinion of FIGURE 17A.

When the gear checker is employed in this fashion, deviations in the standard involute form can be measured in a conventional fashion on a recording trace. In the case of the coast side of the rolled tooth, the trace is indicated in FIGURE 13. FIGURE 14, on the other hand, shows a corresponding trace for the drive side of the rolled tooth. The starting point, which corresponds to a zero reading, is indicated on each of these FIGURES 13 and 14 as 24.5° roll angle. As the die is rotated, readings are obtained on the gear checker. If the readings fall within the enclosed area designated in FIGURES 13 and 14, the involute tolerances specified for the pinion in FIGURES 17, 18 and 19 will have been met.

The maximum deviation from a true involute in the case of FIGURE 13 is .0005″. This occurs at the roll angle of 26.25°. The minimum involute tolerance at that point is .0002″. Finally, when the roll angle of 27.75° is reached, the deviation from the true involute form approaches zero.

In the case of the drive side of the tooth form, the gear checker again is set at a zero reading where the roll angle is 24.5°. In the particular embodiment shown, the permissible deviation will increase linearly as the roll angle increases to a minimum value of 27.75°. The range of permissible tolerance is indicated by the enclosed area of FIGURE 14. The maximum deviation that is permissible occurs at the minimum roll diameter. At that point the deviation from a true involute may be between .0002″ and .0005″.

Figures 10, 11:
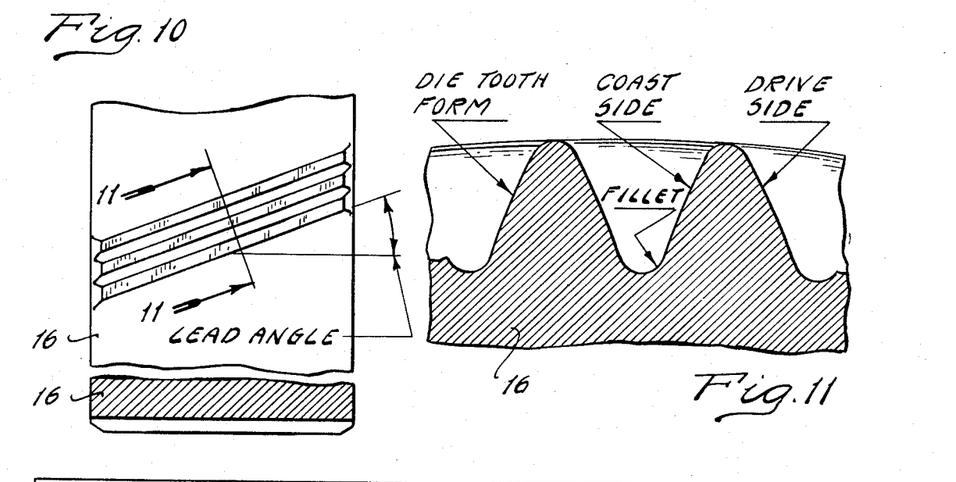
FIGURE 10 is a plan view of the rolling die of FIGURE 8.
FIGURE 11 is a normal sectional view of the rolling die teeth of FIGURE 10.
Figure 12:
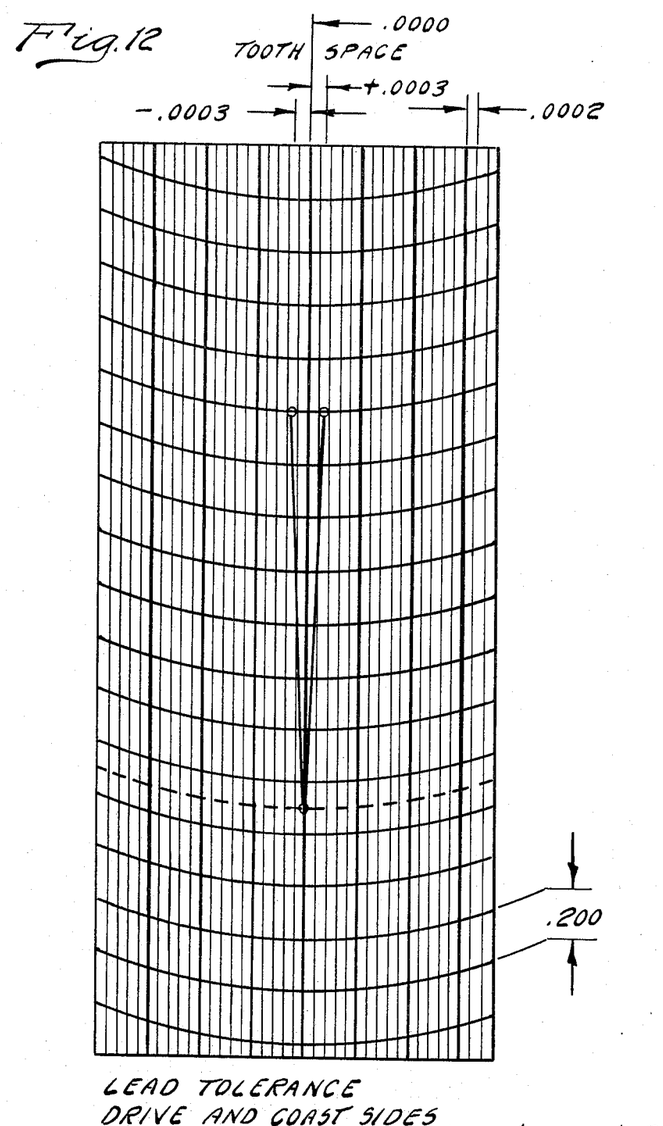
FIGURE 12 is a gear checker recording trace showing the lead tolerance for the helical teeth of the rolling dies of FIGURE 2.

The lead tolerance can be measured by producing a gear checker lead tolerance trace as shown in FIGURE 12. The lead angle, which is best represented in FIGURE 10, can fall within the limits specified by the enclosed area in FIGURE 12. At a point near one side of the tooth, the checking instrument can be set at a zero reading. As the indicator of the checking instrument passes along the tooth in the direction of the axis of the rolling die, readings are obtained. If those readings fall within the enclosed area indicated in FIGURE 12, the lead tolerances indicated for the pinion of FIGURES 17A, 17B, 18 and 19 will have been met. The maximum deviation from the zero reading, which occurs on the opposite end of the tooth, in this particular embodiment, is plus or minus .0003″.

Having thus described a preferred form of my invention, what we claim and desire to secure by use of U.S. Letters Patent is:

1. In a method for generating gear teeth, the steps of forming gear teeth on a pair of circular, gear forming dies, forming said die teeth with a basic rack profile, at least one side of the die teeth having a pressure angle near the root of the tooth that differs from the pressure angle on the same side of the tooth near the tip thereof, mounting said dies for rotation about parallel axes, mounting a gear blank between said dies at a location in proximity to a line drawn between the center of said dies, feeding said dies into said blank and rotating said dies to deform the metal of said gear blank and to generate external teeth on said gear blank thereby providing conjugate gear tooth profiles on said blank.

2. The combination as set forth in claim 1 wherein said conjugate gear tooth profiles are involute profiles.

3. The method steps as set forth in claim 1 wherein double pressure angles on the teeth of said dies are formed on the coast side of each die tooth.

4. The method steps as set forth in claim 3 wherein the pressure angle on the coast side of the die tooth near the tip thereof is larger than the pressure angle on the same side of the die tooth near the root thereof.

5. The method steps as set forth in claim 3 wherein the drive side of the die tooth is formed with a single pressure angle.

6. The method steps as set forth in claim 1 wherein the pressure angle on the coast side of the die tooth near the tip thereof is larger than the pressure angle on the same side of the die tooth near the root thereof.

7. The method steps as set forth in claim 6 wherein the drive side of the die tooth is formed with a single pressure angle.

8. The method steps as set forth in claim 6 wherein the drive side of the die tooth is formed with a single pressure angle.

9. A method for generating gear teeth comprising the steps of forming gear teeth on circular gear forming dies, forming said die teeth with a basic rack profile wherein at least one side of the die teeth has a pressure angle near the root of the tooth that differs from the pressure angle on the same side of the tooth near the tip of the tooth, mounting said dies for rotation about parallel axes, precutting a gear blank to produce involute form gear teeth, said gear teeth being adapted to register with the teeth of said dies, mounting said gear blank between said dies at a location in proximity to a line drawn between the center of said dies, and rotating said dies thereby deforming the metal of said gear blank to generate external teeth on said gear blank and providing conjugate involute gear tooth profiles on said blank.

10. The method steps as set forth in claim 9 wherein the double pressure angles on the teeth of said dies are formed on the coast side of each die tooth.

11. The method steps as set forth in claim 9 wherein the pressure angle on the coast side of the die tooth near the tip thereof is larger than the pressure angle on the same side of the die tooth near the root thereof.

12. The method steps as set forth in claim 9 wherein the drive side of the die tooth is formed with a single pressure angle.

13. A gear rolling die comprising a circular die disc and conjugate teeth formed on the periphery of said disc, at least one side of said teeth having a pressure angle near the tooth root that differs from the pressure angle near the root tip.

14. The combination as set forth in claim 13 wherein said conjugate teeth are involute teeth.

15. The die defined by claim 13 wherein said one side is the coast side of the tooth.

16. The die as set forth in claim 15 wherein the other side of the die tooth has a single pressure angle.

17. The die as set forth in claim 15 wherein the change in pressure angle on the profile on the coast side of the die tooth occurs at a location near the pitch diameter of the die.

References Cited

UNITED STATES PATENTS

| Re. 7,584 | 4/1877 | Comly | 29—159.2 |
| 897,872 | 8/1908 | Brun | 29—159.2 |
| 1,642,179 | 9/1927 | Schurr | 72—105 |
| 1,847,848 | 3/1932 | Ragan | 29—159.2 |
| 2,883,894 | 4/1959 | Tsuchikawa | 72—105 |
| 2,886,990 | 5/1959 | Bregi | 72—105 |
| 2,906,147 | 9/1959 | Pelphrey | 72—105 |

THOMAS H. EAGER, *Primary Examiner.*

UNITED STATES PATENT OFFICE
CERTIFICATE OF CORRECTION

Patent No. 3,362,059

January 9, 1968

John J. Di Ponio et al.

It is hereby certified that error appears in the above numbered patent requiring correction and that the said Letters Patent should read as corrected below.

Column 1, line 13, for "bears" read -- gears --; column 2, line 12, for "side," read -- side --; column 4, line 64, for "beings" read -- begins --; column 7, line 58, and column 8, lines 3 and 31, for "larger", each occurrence, read -- smaller --; column 8, line 5, for the claim reference numeral "6" read -- 2 --; line 8, for the claim reference numeral "6" read -- 4 --; line 40, for "root" read -- tooth --.

Signed and sealed this 14th day of January 1969.

(SEAL)
Attest:

Edward M. Fletcher, Jr.
Attesting Officer

EDWARD J. BRENNER
Commissioner of Patents